No. 890,206. PATENTED JUNE 9, 1908.
J. E. WILLCOX.
CLUTCH.
APPLICATION FILED NOV. 21, 1906.

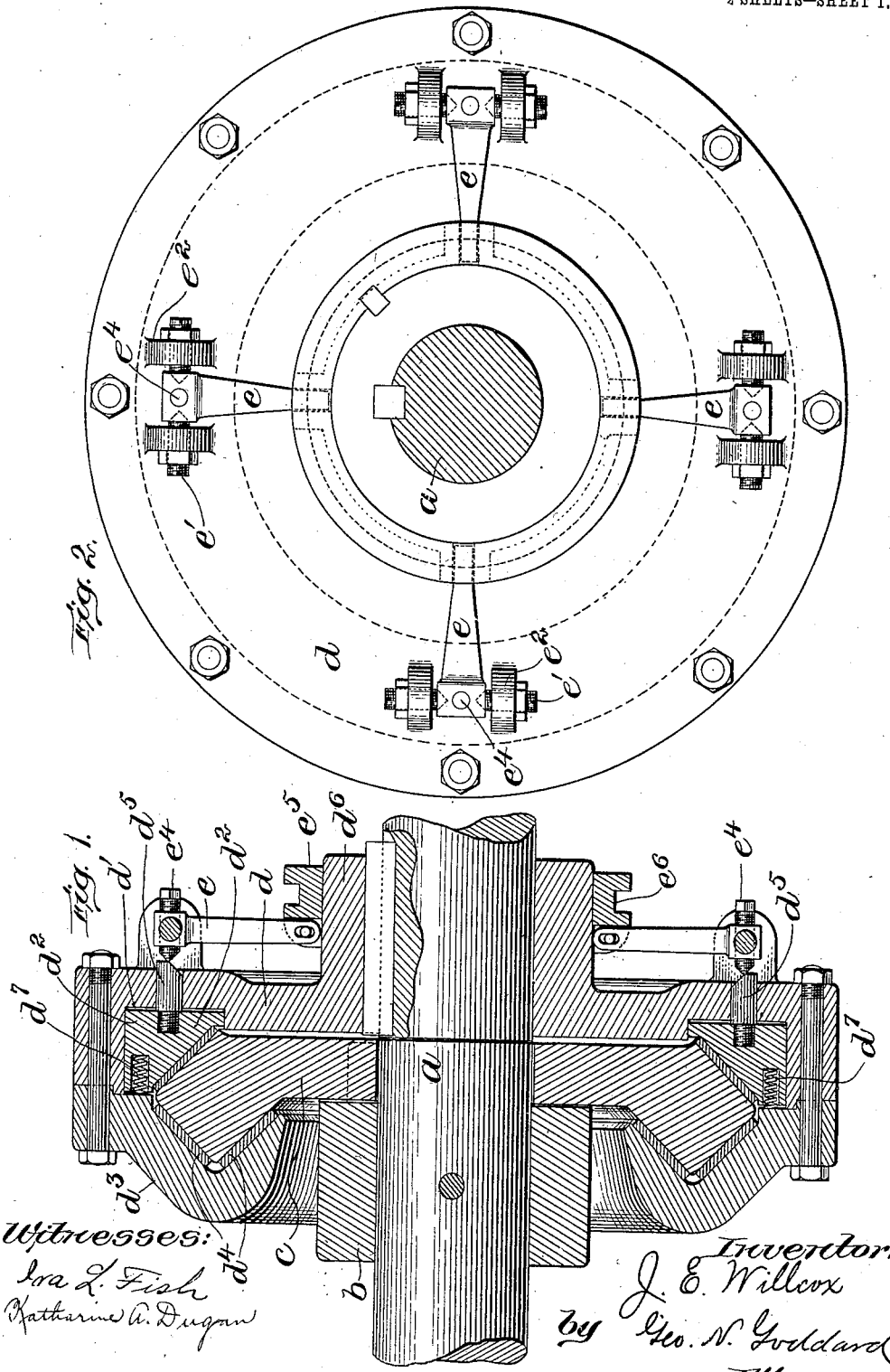

2 SHEETS—SHEET 2.

Witnesses:
Ira L. Fish
Katharine W. Dugan

Inventor:
J. E. Willcox
by Geo. N. Goddard
Attorney.

UNITED STATES PATENT OFFICE.

JAMES E. WILLCOX, OF MALDEN, MASSACHUSETTS.

CLUTCH.

No. 890,206.　　　Specification of Letters Patent.　　　Patented June 9, 1908.

Application filed November 21, 1906. Serial No. 344,421.

*To all whom it may concern:*

Be it known that I, JAMES E. WILLCOX, citizen of the United States, and resident of Malden, Middlesex county, Massachusetts, have invented certain new and useful Improvements in Clutches, of which the following is a specification.

This invention relates to clutches, more particularly to that type known as friction clutches and is intended to provide a simple and effective construction for transmitting from one shaft member to another in a manner to secure the least practical degree of slip under heavy loads without unduly increasing the diameter of the clutch member.

Among the features which specially characterize this invention is the arrangement of the engaging or frictional surfaces of the clutch members on the wedge principle in such a manner that a very large area of frictional surface is secured at that portion of the clutch where the transmission is most effective, namely at its periphery.

Another feature consists in the arrangement whereby one of the clutch members is capable of automatic adjustment to compensate for differences of alinement of the two shaft sections, this being accomplished by means of a sort of universal joint connection with its shaft member in such a way that the binding or sticking of the parts is prevented.

These and other features of the invention will be described in detail in the specification and will be clearly defined in the claims hereto annexed.

Figure 3:
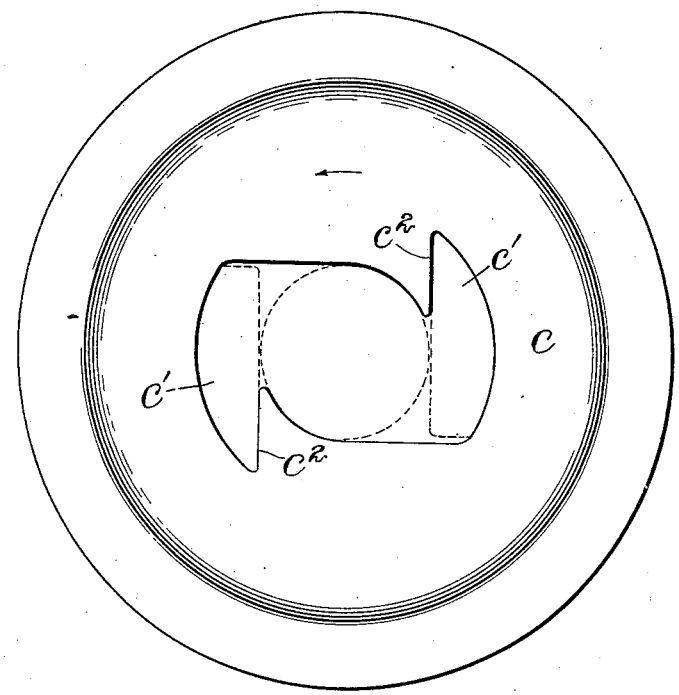
Figure 4:
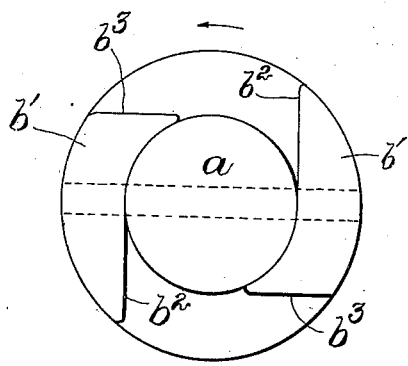

In the accompanying drawings I have illustrated one of the forms of embodying my aforesaid invention, Figure 1 being a central longitudinal section of the complete mechanism assembled in operative position. Fig. 2 is a side elevation thereof showing the position and arrangement of the actuating levers. Fig. 3 is a detail view in elevation of the loosely mounted clutch member. Fig. 4 is a detail view showing the interlocking jaws of the collar engaging said loose member.

In the practice of my invention according to the form illustrated in the drawings the section $a$ of the shaft is provided with a fast collar or sleeve $b$ which is pinned, splined, or otherwise secured to said shaft member so as to rotate with the same. This collar $b$ has projecting jaws or lugs $b'$ whose interlocking faces $b^2 b^3$ are in this instance formed in planes tangent to the shaft $a$ for a reason to be hereinafter described. The clutch disk or member $c$ is in the shape of a wheel or disk whose center is cut out to receive the shaft and also cut away as indicated at $c' c'$ to form apertures or recesses to receive the projecting jaws $b'$ of the collar $b$. The rear end of the jaws $b^3$ are cut away slightly so as to leave a slight clearance or play between them and the opposing face of the clutch member $c$ as indicated in dotted lines Fig. 3. Since the jaws have their engaging faces tangent to the shaft and their rear ends separated by a slight clearance it is possible for the clutch member $c$ to be deflected quite materially from the perpendicular plane without its becoming bound or jammed into a tight engagement with the transmitting collar $b$ since the rocking of these parts about a transverse horizontal axis according to the illustration in Fig. 3 would not cause any such binding or jamming, nor would such consequence result from a similar rocking or twisting about a vertical transverse plane, since the rear end or face of each jaw is left with a clearance. The same statement obviously applies to any rocking about intermediate axes.

The frictional faces of the clutch member $c$ are formed near its periphery because at that point the effective transmission is the greatest. In order to provide a large frictional engaging surface as far from the center as possible the peripheral portion of the disk or member $c$ is provided with a wedge-shaped head having three annular faces lying in planes that are angularly disposed with reference to the perpendicular plane or plane of rotation.

The coöperating member which may be termed the gripping member, because it surrounds and actively grips or pinches the first named member $c$, comprises a radial disk or wheel $d$ provided with an annular groove $d'$ in which is mounted an annulus or ring $d^2$ movable axially of the clutch by mechanism hereafter to be described. This member $d$ is also provided with an overhanging rib or shoulder $d^3$ which is formed with a V-shaped annular channel in which are seated any suitable friction shoes $d^4$ the same conforming to the wedge shape of the corresponding portion of the member $c$ which projects into this V-groove. The ring $d^2$ is employed to force the wedge-shaped portion of the clutch member $c$ tightly into its corresponding V-groove and to that end is provided with suitable mechanism for securing this squeezing action. In this case the ring is provided with rearwardly projecting pins or studs $d^5$ having a portion of its rear face beveled to form an inclined plane or face to be engaged by the actuating mechanism. This actuating mechanism comprises a series of levers $e$ pivotally mounted upon adjustable bearing pins $e'$ carried by projecting studs $e^2$ arranged at suitable intervals around the rear face of the clutch member $d$. The levers $e$ are provided with projecting pins or set screws $e^4$ which are tapped through the pivotal axis and project sufficiently to engage the rear faces of the studs $d^5$. The levers are actuated by a radially sliding collar $e^5$ with which they have suitable engagement, said collar being provided with a groove $e^6$ to receive an actuating fork or yoke, the collar being arranged to slide on the central hub $d^6$ of the member $d$. Obviously the movement of the collar $e^5$ inward toward the rear face of the member $d$ causes the projecting pins of the engaging pin $e^4$ acting against the inclined faces of the studs $d^5$ to push said ring $d^2$ forward against the clutch member $c$ thereby pinching said clutch member against the friction shoes $d^4$. It is also obvious that if the collar $e^5$ is pushed inward to throw the levers $e^4$ beyond the dead center the levers $e^4$ will then be locked on a sort of toggle principle against any accidental displacement no matter how great the strain on the clutch may be. The pins $e^4$ are screw-threaded so as to adjust them to proper position and also for the purpose of taking up wear.

When the lever actuating sleeve $e^5$ is swung outward away from the rear face of the clutch member $d$, the ring $d^2$ is left free to move back out of its engagement with the clutch member $c$. This disengaging movement may be accomplished by means of springs $d^7$ seated in recesses in the ring $d^2$ so as to normally exert a thrust against the opposing wall of the overhanging lip $d^3$.

The important features of the above described construction are flexibility with which the clutch will accommodate itself to differences in alinement of the two shaft sections; second, the large frictional area disposed at the most efficient part of the clutch, namely its periphery; third, the center contrivance by which the actuating mechanism is automatically and positively locked against displacement by pressure between the clutch members.

The setting and unsetting of the clutch produces no longitudinal pull or thrust on the shaft section since the inner member is free to move lengthwise of the shaft.

Without attempting to describe the various modifications of form, construction and arrangement that may be made in the practice of my invention, what I claim is:—

1. A device of the class described embracing sectional shaft members, a clutch member having universal joint connection with one of said shaft members, a coöperating clutch member secured to the other shaft member and provided with annular friction faces angularly disposed with relation to each other to engage an annular portion of said first shaft member.

2. A device of the class described embracing in combination sectional shaft members, a clutch member having universal joint connection with one of said shaft members, the engaging faces of said joint being formed in planes tangent to the shaft, a coöperating clutch member secured to the other shaft member and provided with annular faces to engage an annular portion of said first shaft member.

3. In a device of the class described the combination of the shaft section, a clutch member loosely mounted on said shaft section, a collar fixed to said shaft section, said clutch member and said collar having loosely interlocking jaws, said jaws having engaging faces extending in planes tangent to the shaft.

4. The combination of a clutch member provided with a V-shaped annular groove, a coöperating clutch member provided near its periphery with an annular wedge-shaped rib, an axially movable ring carried by said first clutch member and adapted to engage the peripheral portion of said coöperating clutch member to force the rib portion thereof into engagement with the V-shaped groove, substantially as described.

5. The combination of two clutch members one of which is provided with an annular enlargement at its periphery, the other member being formed with an annular channel or recess inclosing the said annular enlargement on three sides, and means for contracting said inclosing member in an axial direction to cause it to grip the three sides of said annular enlargement of the opposing member.

6. The combination of the two coöperating clutch members, one of which is movable to grip the other, said movable member being provided with a series of inclined faces extending obliquely to the axis of the clutch, and with a series of transverse faces adjacent to said oblique faces, pivoted members arranged to engage the said oblique faces during the initial part of their pivotal movement to actuate the moving member, said pivoted members being arranged also by their further traverse to engage the transverse faces and lock the movable member in gripping position, substantially as described.

In witness whereof, I have hereunto set my hand, this seventh day of November, 1906.

J. E. WILLCOX.

In the presence of—
Geo. N. Goddard,
Katharine A. Dugan.